Aug. 3, 1943.      R. O. PETERSON      2,325,629
END BRUSH
Filed Aug. 3, 1940

INVENTOR.
RUBEN O. PETERSON
BY
ATTORNEYS

Patented Aug. 3, 1943

2,325,629

UNITED STATES PATENT OFFICE 2,325,629

END BRUSH

Ruben O. Peterson, South Euclid, Ohio, assignor to The Osborn Manufacturing Company, Cleveland, Ohio, a corporation of Ohio Application August 3, 1940, Serial No. 350,607

5 Claims. (Cl. 300—21)

This invention relates as indicated to wire brushes, and more particularly to the type commonly known as end brushes, and more especially to end brushes and their mode of manufacture characterized by the fact that a brush of improved durability as compared with prior art structures is produced, as well as the fact that the brush unit as thus produced may be employed as a unit in a composite structure, either as a single refillable insert in such structure or as the individual part of a plurality of the same thus assembled in a built-up composite structure.

So-called end brushes have heretofore been constructed by providing a solid member or holder with a recess provided with a closed bottom with such recess partially filled with molten solder and the end of the individual wires or strands of the brush then placed as a bundle in such recess to be secured therein by the solder upon solidification. This mode of manufacture has been an inconvenient and uneconomical one; the structures produced thereby have not always been entirely satisfactory in that difficulty has been encountered in insuring that all of the individual strands or wires of the brush will be properly secured in the socket and by the prior art structures thus produced the same have been limited in their uses.

It is a principal object of my invention therefore to provide an improved method of manufacturing end brushes of this character so that in the resultant structure all of the wires comprising the body of the brush are firmly secured in the holder.

It is a further object of my invention to provide a brush structure which may be used in a greater variety of ways than has been possible with end brushes of the prior art.

Other objects of my invention will appear as the description proceeds.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

Figure 1:
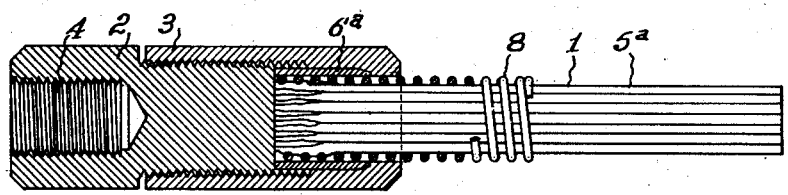
Fig. 1 is a side elevational view partially in section of an end brush constructed in accordance with the principles of my invention shown associated with a suitable holder therefor.
Figure 1A:
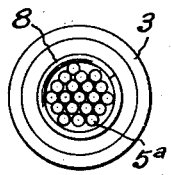
Fig. 1A is a right hand end elevational view of the structure illustrated in Fig. 1.

Referring now more specifically to the drawing and more especially to Fig. 1, the structure here illustrated comprises a brush unit generally indicated at 1 constructed in accordance with the principles of my invention, supported by a suitable holder which comprises a body portion 2 and a securing thimble 3. The body portion 2 is provided with a threaded hole 4 by which the holder may be secured in or to an appropriate operating tool, and the element 3 comprises a sleeve or thimble threadably secured to the body 2 and forwardly provided with a reduced opening for the purpose of securing the brush unit 1 to the body 2. The construction and mode of manufacture of the unit 1 will be explained by having reference to certain of the other figures in the drawing, such as Figs. 2 to 7.

As previously indicated, the brush constructed in accordance with my invention may be formed either of straight wires or of crimped wires depending upon the particular use for which the brush is designed. The type of wire used in the crimped wire construction will be such as is conventionally used in crimped wire brushes so that further reference to the particular type of wire employed in the two modifications illustrated and presently to be described is believed unnecessary.

Figure 3:
Figs. 2, 3, 4 and 5 show the various steps in the fabrication of an end brush in accordance with my invention in which the individual wires thereof are crimped.
Figure 2:
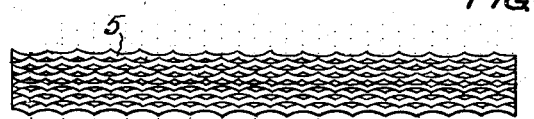

A bundle 5 of a proper number of crimped wires is arranged as illustrated in Fig. 2 and after being thus arranged in alignment and preferably with the ends thereof in substantially a common plane, a band 6, as illustrated in Fig. 3, is placed about the bundle 5 and the band closed upon itself. This operation of providing the bundle of wires 5, the split band 6, and the arrangement of such band on the bundle of crimped wires, may be performed either manually or preferably in a suitable machine provided with the necessary gripping jaws and dies. Since the construction and operation of the machine necessary to perform these various steps is not a part of the present invention it will not be described.

Figure 4:
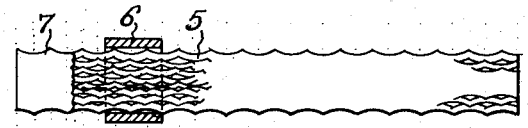
Figure 11:
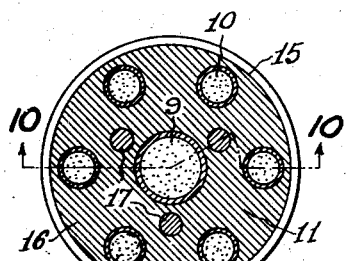
Fig. 11 is a transverse sectional view of the structure illustrated in Fig. 10 taken on the plane substantially indicated by the line 11—11.

It will be noted that the band 6 is placed about the bundle of wires 5 at a point removed from the left hand end thereof, as viewed in Fig. 4. The distance which the wires project from the left hand edge of the band 6 at the stage of manufacture illustrated in Fig. 4 should be approximately the axial extent of the band 6.

After the parts have been assembled in the manner illustrated in Fig. 4, the projecting ends 7 of the wires 5 will be dipped in molten solder for the purpose of coating the wires and preliminarily uniting the same in a bundle. After the ends 7 of the wires 5 are thus coated the sleeve 6 is held in a suitable die and the bundle of wires and sleeve moved relatively axially and the coated ends 7 of the bundle 5 forced into the sleeve 6. This may be accomplished either by pressure applied to the coated ends 7 of the wires, or by tension applied to the wires at their right hand end as viewed in Fig. 5, for example, with the sleeve 6 held stationary in a die.

It will be observed that the sleeve 6 is formed from a circularized flat band of such length that it will, when its opposite ends are brought together, snugly embrace the bundle of wires 5. The employment of this split sleeve 6 and the mode of its application to the bundle of crimped wires 5 makes possible a more ready assembly of the crimped wires and in a more compact relation than would be possible by the employment of an endless sleeve into which the bundle of wires would then have to be moved axially.

Figure 5:
Figure 6:
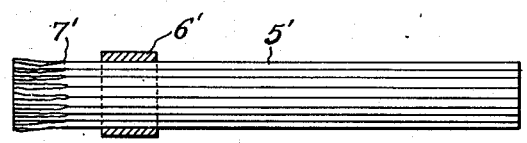
Figs. 6 and 7 are views showing stages in the manufacture of an end brush constructed in accordance with my invention and formed of straight wires.

When, however, the brush is to be constructed of straight wires, then an endless sleeve such as 6', shown in Fig. 6, may be employed, since it is possible to conveniently assemble the bundle of straight wires 5' in such endless sleeve 6'. After the endless sleeve 6' and the bundle of straight wires 5' have been assembled in the manner illustrated in Fig. 6, then the projecting ends 7' of the bundle 5' are dipped in solder and the procedure explained above in connection with the formation of the element illustrated in Fig. 5 followed in the production of the element illustrated in Fig. 7.

Where greater strength of bond is required than that which would be provided by the use of conventional solder, brazing compound of appropriate composition may be employed instead, and my invention is not to be limited to the particular type of securing medium employed; solder and brazing compound being illustrative of the type of material which is readily available and which, due to its melting point as compared with the melting point of the wire, has been found particularly useful.

Figure 7:
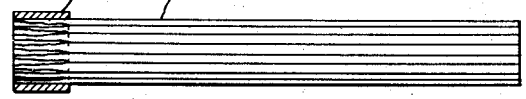

The inner surface of the sleeves 6 and 6' may conveniently be tinned or similarly coated with a material which readily interfuses with the material into which the ends 7 or 7' of the wires have been dipped. When this is done, a further step may be resorted to in order to produce a structure which is even stronger than that which results from the procedure described thus far. In other words, after the parts have been assembled into the condition illustrated in Figs. 5 and 7, molten solder or suitable joining material may be applied to the end 7 or 7' of the wires so that the same will penetrate any spaces left in the bundle of wires at that point and not only secure such individual wires into a solid structure but also braze or otherwise unite the bundle of wires to the inner surface of the sleeve 6 or 6'. The mere application of heat to the end of the structure thus formed, as illustrated in Figs. 5 and 7, may be sufficient for certain purposes in further interfusing the bonding material on the ends of the wires and an attachment of the same to the sleeve.

Figure 10:
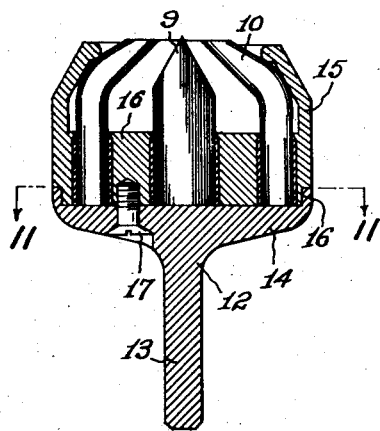
Fig. 10 is a transverse sectional view of a brush holder in which are mounted a plurality of individual units constructed as shown, for example, in Figs. 6 and 7.
Figure 8:
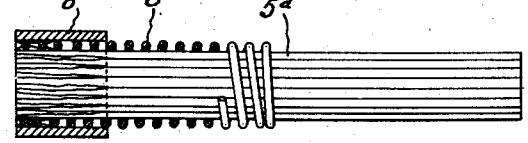
Fig. 8 is a side elevational view, partially in section, of the end brush unit manufactured in accordance with the procedure outlined in Figs. 6 and 7 and comprising a portion of the structure illustrated in Figs. 1 and 2.
Figure 9:
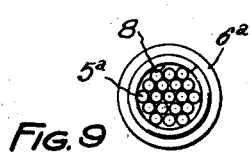
Fig. 9 is a right hand end elevational view of the structure illustrated in Fig. 8.

The procedure above outlined will result in the production of a brush unit which can be conveniently employed as an element of a composite structure, as previously explained and as illustrated for example in Figs. 1 and 10. The structure illustrated in Fig. 8 and which forms a part of the composite structure illustrated in Fig. 1, is slightly different from that illustrated in Figs. 5 and 7 in that a coil spring is arranged about that area of the wire bundle where it extends into the terminal supporting and securing sleeve for the purpose of dampening vibrations in the individual wires during use, and accordingly for the purpose of preventing breakage of the wires in the area where they enter the securing and supporting sleeve. This helical spring, generally indicated at 8, may conveniently extend into the sleeve 6a and when a unit such as illustrated in Fig. 8 is formed in the manner previously explained in connection with the description of Figs. 5 and 7, the spring may, when the parts are at the stage of manufacture illustrated by Figs. 4 and 6, extend slightly to the left of the sleeve 6a. When the ends of the wires are then dipped in solder or other suitable bonding material, the spaces between the convolutions of the spring 8 will be filled with such bonding material and the same then assists not only in securing the bundle of wires within the sleeve 6a but also anchors the spring 8 in such sleeve.

From the foregoing description of the mode of manufacture of the brush unit comprising my invention it will be observed that I produce a unit which may be conveniently employed as an insert in a composite structure. This, as indicated, makes possible the building up of composite brushes as well as the ready replacement of individual brush units as they become worn. In the structures produced by my process it will be observed that a shoulder is provided by the radially projecting peripheral edge of the sleeve and such edge may conveniently be employed as the means by which the refillable unit is anchored in its supporting holder. Thus the reduced end of the thimble 3 of Fig. 1 may engage the peripheral edge of the sleeve and secure the spring unit in the holder, or a variety of different forms of holders of which that illustrated in Fig. 10 is an example, may be employed.

The brush holder shown in Fig. 10 has been designed for the performance of a particular brushing operation where a centrally arranged unit 9 is designed to operate on a central area and where the plurality of spaced units 10 arranged in an annular area 11 are designed for operation on an area concentric with that operated upon by the central unit 9. The holder illustrated in Fig. 10 is an excellent illustration of the many uses to which the brush unit of my invention may be placed and the manner in which such brush units may be fabricated into a wide variety of composite structures for the performance of particular tasks. The base 12 of the holder of Fig. 10 comprises a supporting shank 13 and a circular head 14 to which are secured an annulus 15 and a plate 16, the former being attached as by a screw or brazed joint as at 16 and the latter being attached as by spaced bolts 17. By having the openings in the plate 16 in which the brush units are mounted of slightly reduced diameters at their upper ends, such plate may have engagement with the shoulders provided by the edges of the sleeve 6 on the brush units and the latter held in securely assembled relation. The upper circumferential edge of the annulus 15 may be of reduced diameter, as shown, in order to give an inward direction to the operating ends of the brush units arranged in the annular area 11.

From the foregoing description it will be observed that I have provided not only an improved method for the manufacture of wire end brushes, but have also produced a structure which is new in itself and which is adapted to a wide variety of uses not possible by the structures of the prior art.

Instead of relying on a clamping action in securing the brush units of my invention in a suitable holder, such as for example the types illustrated in Figs. 1 and 10, the fact that the bound end of the brush unit is provided with an annular band makes possible the formation thereon either prior to or subsequent to assembly of other conventional locking expedients such as threads, bayonet joints, and the like. Thus, for example, a thread may be cut on the annulus 6 before or after fabrication; a roller annulus having a thread formed thereon may be used, or a radially projecting flange may be provided on the annulus 6 by which locking of the brush unit to the holder may be facilitated.

The combination of a bridle, specifically illustrated herein as a coil spring 8 disposed about the bundle of bristles or brush material adjacent the mounting member receiving such end and wherein such end is secured forms the subject matter of my co-pending application filed April 22, 1943, Serial No. 483,982.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. The method of making a wire brush unit which comprises providing a bundle of brush wires, placing a closely fitting coil spring about such bundle adjacent one end, placing an annulus about such bundle and spring a short distance from such end, applying a bonding medium to such end to combine such wires and spring into a unit, and relatively moving such annulus and unit to press fit such bonded end in such annulus with the remainder of such bundle and a portion of such encircling spring protruding therefrom.

2. The method of making a wire brush unit which comprises providing a bundle of brush wires arranged in substantial parallelism, placing a metal annulus about such bundle a short distance from one end of the bundle, applying molten metal to such end to interfuse such wires into a solid body, relatively moving such annulus and bundle to press-fit such annulus about such end, and heating such end and annulus to bond the same more firmly together, the inner surface of such annulus being coated with a metal adapted to interfuse readily with the metal employed to interfuse the ends of the wires.

3. The method of making a wire brush unit which comprises providing a bundle of brush wires arranged in substantial parallelism, placing a metal annulus about such bundle at a distance from an end of such bundle approximately equal to the axial extent of such annulus, applying molten metal to such end of the bundle to interfuse such wires into a solid body, relatively moving such annulus and end to press fit such solid end in such annulus, and then applying additional molten metal to the wires within such annulus to further bond said wires and annulus together.

4. As a new article of manufacture, a wire brush unit comprising a bundle of wires, a coil spring about a portion of such bundle adjacent one end, a metallic bonding medium uniting such end of said bundle and said spring into a solid body, and a metal annulus press-fitted about such end, a portion of said spring protruding from said annulus and extending along said bundle.

5. As a new article of manufacture, a brush comprising a bundle of bristles arranged in substantial parallelism, a coil spring about a portion of such bundle adjacent one end and a hollow mounting member receiving such end and wherein such end is secured by a suitable bonding medium, a portion of said spring protruding from said member and extending along such bundle.

RUBEN O. PETERSON.